Patented June 24, 1930

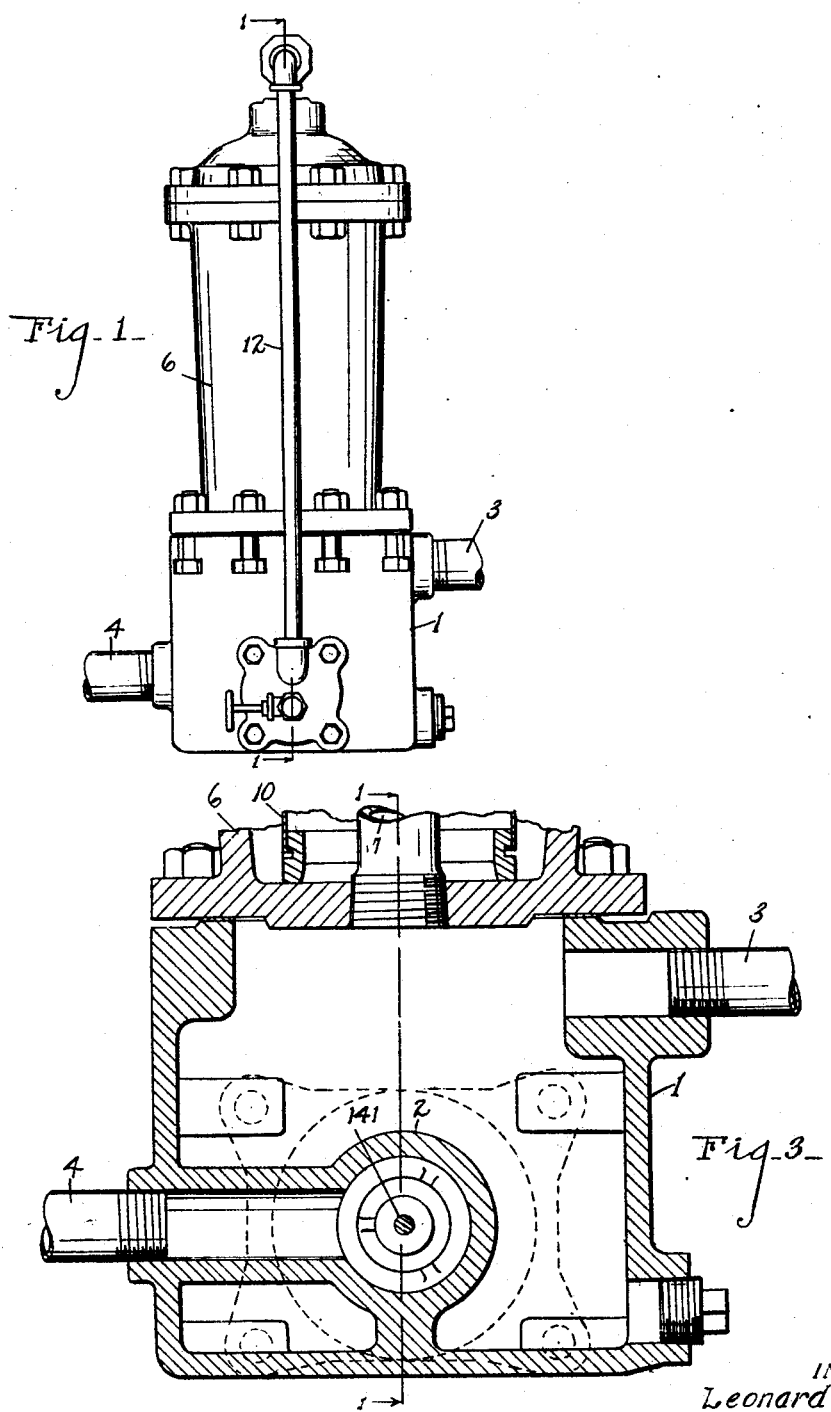

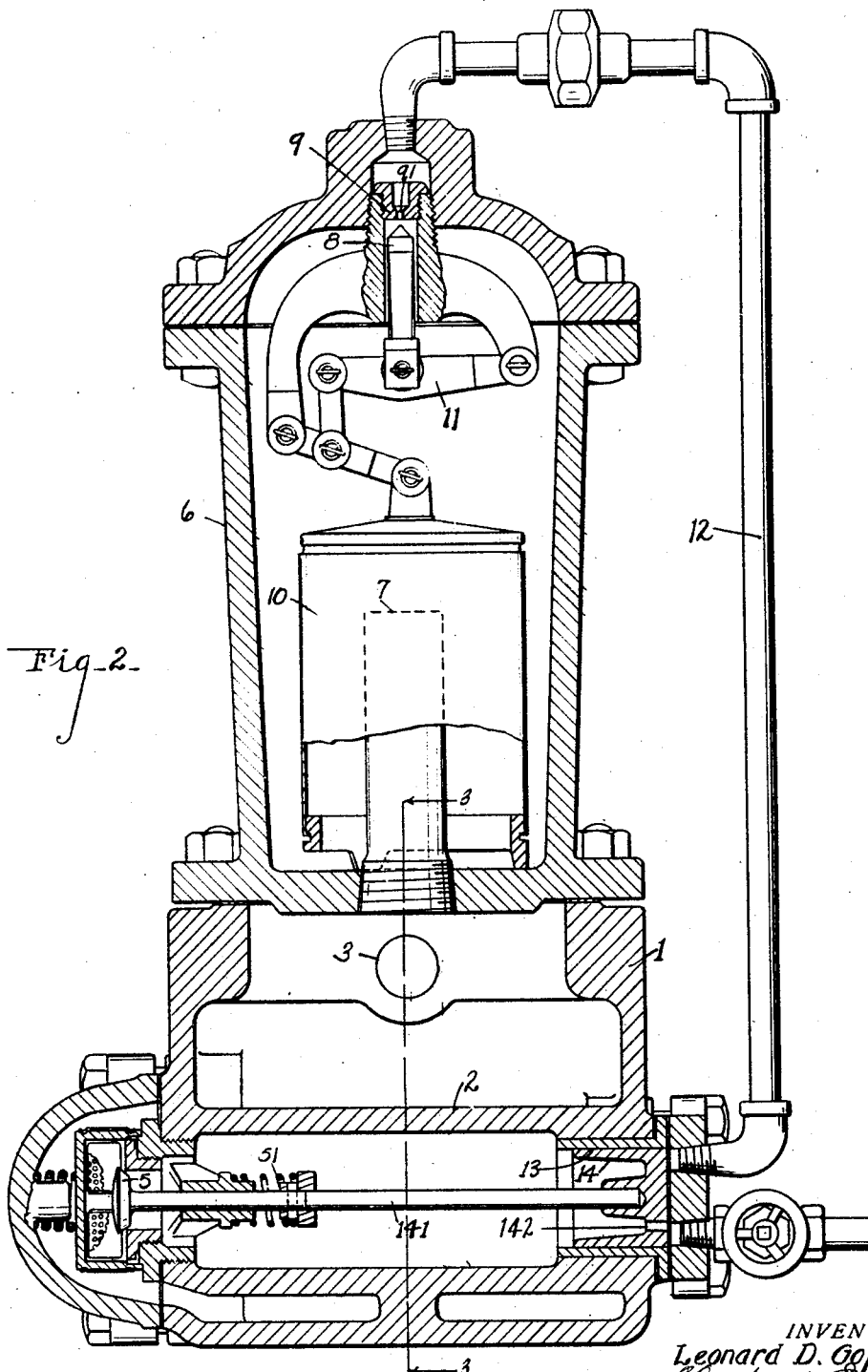

1,767,063

UNITED STATES PATENT OFFICE

LEONARD D. GOFF, OF THREE RIVERS, MICHIGAN, ASSIGNOR TO ARMSTRONG MACHINE WORKS, OF THREE RIVERS, MICHIGAN

STEAM TRAP

Application filed February 14, 1927. Serial No. 168,049.

This invention relates to an improved steam trap with a piston controlled water valve.

The main object of the invention is to provide in a steam trap structure an effective piston controlled water valve.

Objects pertaining to details and economies of my invention will definitely appear from the detailed description to follow. The invention is clearly defined and pointed out in the claim.

A structure embodying the features of my invention is clearly illustrated in the accompanying drawing forming a part of this application, in which:

Fig. 1 is an elevation view of a steam trap showing the inlet and outlet pipes broken away.

Fig. 2 is an enlarged detail sectional elevation view taken on line 2—2 of Figs. 1 and 3 showing the details of the steam trap and the piston controlled water valve.

Fig. 3 is an enlarged detail sectional view, transverse to the water piston control, on line 3—3 of Fig. 2.

The parts of the drawing will be identified by their numerals which are the same in all views.

1 is the hollow base. 2 is the water valve chamber. 3 is the inlet to the base and 4 is the outlet leading from the valve chamber 2. 5 is the piston actuated water valve. 6 is the chamber of the steam trap valve means, flanged and bolted to the upper face of the hollow base 1. 7 is the steam passage thereto. 8 is the trap valve. 9 is the steam trap valve seat and 91 the port. 10 is the inverted float bucket of the steam trap disposed above the steam entrance passage 7. 11 is the compound lever control from the inverted bucket to the steam trap valve. 12 is the control pipe connection from the top of the steam trap valve chamber to the water valve control cylinder. 13 is the water valve engine cylinder. 14 is the water valve piston connected by suitable piston rod 141 to the valve 5. Piston 14 is perforated at 142 to form a water passage of slightly less capacity than the valve port 91. 51 is a spring for holding the valve 5 normally seated. 52 is a screen around the same.

Because the aperture 142 is somewhat smaller in capacity than the port 91 in the valve of the steam trap, when the trap is full of water and water is passing through the valve 9, it reacts against the piston 14 and opens the water valve 5 which permits the rapid discharge of water from the hollow base, and this continues, of course, as long as there is sufficient pressure in the pipe 12. However, when the water is discharged and steam enters, it raises the inverted bucket float 10 which, reacting through the compound lever 11, closes the valve 8. As soon as this valve closes the pressure in the base and the spring 51 tend to close the valve 5 and the same gradually closes by forcing water through aperture 142, thereby trapping the steam. The water has been allowed to escape very freely and rapidly.

The piston control valve is an auxiliary, opened by relay, so to speak, from the valve of the steam trap, thus speeding up the discharge of water and increasing the efficiency of the trap.

In order that the action may be very clear, it is explained in detail that the trap fills with condensate and because all steam is condensed the trap opens as seen in Fig. 2 and water flows past the valve 9 into the pipe 12 under pressure and forces the piston 14 to the left of Fig. 2. This opens the valve 5 and permits the rapid discharge of water from the hollow trap base 1 into the casing 2 and out at the outlet 4. The water is soon discharged, steam enters through the port 3 and passes up through the steam passage 7 into the bell 10 of the trap, causing it to rise and react on the compound lever 11 and close the valve 8 against its seat 9. The flow of water through pipe 12 is then cut off. Spring 51 acts through the valve stem 151 which constitutes the piston rod to the piston 14, forces the piston to the bottom of the cylinder 13, which is permitted because of the port 142. The valve 5 then remains in closed position until the trap again becomes water-logged and the bell 10 consequently drops and opens the valve 8, when the cycle is repeated.

I desire to claim the structure specifically as well as broadly, as pointed out in the appended claim.

Having thus described my invention, what I claim as new and desire to secure by Letters Patent is:

The combinatiton of a hollow base structure, with intake and outlet for the steam line being trapped, an inverted bucket type float steam trap of usual construction mounted on said hollow base, a piston actuated spring loaded valve for controlling the outlet from said base, the piston of which contains a by-pass perforation of less capacity than the valve port of the steam trap, and connections beyond the steam trap valve to the cylinder of the piston control whereby the pressure of water passing the steam trap will open the piston actuated valve against the spring pressure and which will allow the piston actuated valve to close when steam actuates the steam trap valve.

In witness whereof I have hereunto set my hand.

LEONARD D. GOFF.